United States Patent
Jia et al.

(10) Patent No.: US 10,183,282 B2
(45) Date of Patent: *Jan. 22, 2019

(54) NOBLE METAL ZEOLITE CATALYST FOR SECOND-STAGE HYDROCRACKING

(71) Applicants: Jifei Jia, Hercules, CA (US); Andrew Rainis, Walnut Creek, CA (US); Theodorus Ludovicus Michael Maesen, Moraga, CA (US); Richard Coser, Fairfield, CA (US); Yihua Zhang, Albany, CA (US)

(72) Inventors: Jifei Jia, Hercules, CA (US); Andrew Rainis, Walnut Creek, CA (US); Theodorus Ludovicus Michael Maesen, Moraga, CA (US); Richard Coser, Fairfield, CA (US); Yihua Zhang, Albany, CA (US)

(73) Assignee: Chevron U.S.A. Inc., San Ramon, CA (US)

(*) Notice: Subject to any disclaimer, the term of this patent is extended or adjusted under 35 U.S.C. 154(b) by 620 days.

This patent is subject to a terminal disclaimer.

(21) Appl. No.: 14/602,394

(22) Filed: Jan. 22, 2015

(65) Prior Publication Data

US 2016/0214094 A1 Jul. 28, 2016

(51) Int. Cl.

| | |
|---|---|
| *B01J 29/06* | (2006.01) |
| *B01J 29/12* | (2006.01) |
| *C10G 47/18* | (2006.01) |
| *B01J 37/02* | (2006.01) |
| *B01J 37/04* | (2006.01) |
| *B01J 35/10* | (2006.01) |
| *B01J 35/00* | (2006.01) |
| *B01J 37/30* | (2006.01) |
| *B01J 37/00* | (2006.01) |
| *C10G 47/16* | (2006.01) |

(52) U.S. Cl.
CPC .......... *B01J 29/12* (2013.01); *B01J 35/0026* (2013.01); *B01J 35/1004* (2013.01); *B01J 37/0009* (2013.01); *B01J 37/0201* (2013.01); *B01J 37/0207* (2013.01); *B01J 37/0236* (2013.01); *B01J 37/04* (2013.01); *B01J 37/30* (2013.01); *C10G 47/16* (2013.01); *C10G 47/18* (2013.01); *B01J 2229/18* (2013.01); *B01J 2229/186* (2013.01); *B01J 2229/20* (2013.01); *B01J 2229/40* (2013.01); *B01J 2229/42* (2013.01)

(58) Field of Classification Search
CPC ...... B01J 29/12; B01J 29/126; B01J 2229/40; B01J 2229/18; B01J 2229/186; B01J 2229/20; B01J 2229/42; B01J 35/1004; B01J 35/0026; B01J 37/0009; B01J 37/0207; B01J 37/0201; B01J 37/0236; B01J 37/04; B01J 37/30
USPC .............................................. 502/64, 66, 74
See application file for complete search history.

(56) References Cited

U.S. PATENT DOCUMENTS

| | | | |
|---|---|---|---|
| 5,391,291 A | 2/1995 | Winquist et al. | |
| 6,030,921 A | 2/2000 | Ziemer | |
| 6,136,181 A | 10/2000 | Ziemer | |
| 2004/0092384 A1* | 5/2004 | Timken | B01J 29/084 502/64 |
| 2005/0197249 A1* | 9/2005 | Creyghton | B01J 23/888 502/439 |
| 2011/0000824 A1* | 1/2011 | Zhan | B01J 35/1066 208/300 |
| 2012/0275993 A1* | 11/2012 | Olson | C01B 39/026 423/700 |

FOREIGN PATENT DOCUMENTS

| | | |
|---|---|---|
| EP | 0124120 | 6/1987 |
| WO | 98/42805 | 10/1998 |

OTHER PUBLICATIONS

Bridge, et al., Isocracking-Hydrocracking for Superior Fuels and Lubes Production, Handbook of Petroleum Refining Processes, Chapter 7.1, edited by Robert A Meyer, 3rd ed., 2004. New York, McGraw-Hill.
ICR Resid Hydrotreating Catalysts by Advanced Refining Technologies.
Statement Regarding "Technology Marketing" Web Page, ISOCRACKING Catalysts, http://www.chevrontechnologymarketing.com/ART_Catalysts/Isocracking_Catalysts.aspx.
Timken, et al., New Generation of Isocracking Catalysts, Block 2, Forum 6 paper, 9 pages.
UOP Adsorbents, A Family of High Performance Powders, UOP Versal Alumina, Apr. 2012, 12 pages.

* cited by examiner

*Primary Examiner* — Elizabeth D Wood
(74) *Attorney, Agent, or Firm* — Susan M. Abernathy; Mark L. Warzel

(57) ABSTRACT

A second-stage hydrocracking catalyst is provided comprising:
a. from 40 wt % to 70 wt % of a zeolite USY having an ASDI from 0.05 to 0.18;
b. an amorphous silica alumina;
c. a second alumina; and
d. 0.1 to 10 wt % noble metal; wherein the second-stage hydrocracking catalyst has a BET surface area from 450 to 650 m²/g. A second-stage hydrocracking process is provided comprising using the second-stage hydrocracking catalyst to produce middle distillate. A method for making the second-stage hydrocracking catalyst is also provided.

15 Claims, 2 Drawing Sheets

NOBLE METAL ZEOLITE CATALYST FOR SECOND-STAGE HYDROCRACKING

TECHNICAL FIELD

This application is directed to a second-stage hydrocracking catalyst, a process for second-stage hydrocracking of a hydrocarbonaceous feed, and a method for making a second-stage hydrocracking catalyst.

BACKGROUND

Improved second-stage hydrocracking catalysts and processes for using them and making them are needed. Earlier second-stage hydrocracking catalysts have not provided the desired improved levels of activity to make high quality middle distillates. Earlier second-stage hydrocracking catalysts have provided good yields of middle distillate and heavy naphtha, but at lower activity that what is optimal.

SUMMARY

This application provides a second-stage hydrocracking catalyst, comprising:
  a. from 40 wt % to 70 wt % of a zeolite USY having an ASDI from 0.05 to 0.18;
  b. an amorphous silica alumina;
  c. a second alumina; and
  d. 0.1 to 10 wt % noble metal; wherein the second-stage hydrocracking catalyst has a BET surface area from 450 to 650 m²/g.

This application also provides a second-stage hydrocracking process, comprising:
  hydrocracking a hydrocarbonaceous feed having an initial boiling point greater than 380° F. (193° C.) in a second-stage hydrocracking reactor using a second-stage hydrocracking catalyst, wherein greater than 10 wt % of an effluent from the second-stage hydrocracking reactor has a hydrocracked boiling point less than 380° F. (193° C.); wherein the second-stage hydrocracking catalyst comprises:
  a. from 40 wt % to 70 wt % of a zeolite USY having an ASDI from 0.05 to 0.18;
  b. an amorphous silica alumina;
  c. a second alumina; and
  d. 0.1 to 10 wt % noble metal; and
wherein the second-stage hydrocracking catalyst has a BET surface area from 450 to 650 m²/g.

This application also provides a method for making a second-stage hydrocracking catalyst, comprising:
  a. mixing together from 40 wt % to 70 wt % of a zeolite USY having an ASDI from 0.05 to 0.18, an amorphous silica alumina, a second alumina, and enough liquid to form an extrudable paste;
  b. extruding the extrudable paste to form an extrudate base;
  c. impregnating the extrudate base with a metal impregnation solution containing at least one noble metal to make a metal-loaded extrudate; and
  d. post-treating the metal-loaded extrudate by subjecting the metal-loaded extrudate to drying and calcination; wherein the second-stage hydrocracking catalyst has: improved activity for producing products boiling within 250° F. (121° C.) to 700° F. (371° C.) and a BET surface area from 450 to 650 m²/g.

The present invention may suitably comprise, consist of, or consist essentially of, the elements in the claims, as described herein.

GLOSSARY

Figure 1:
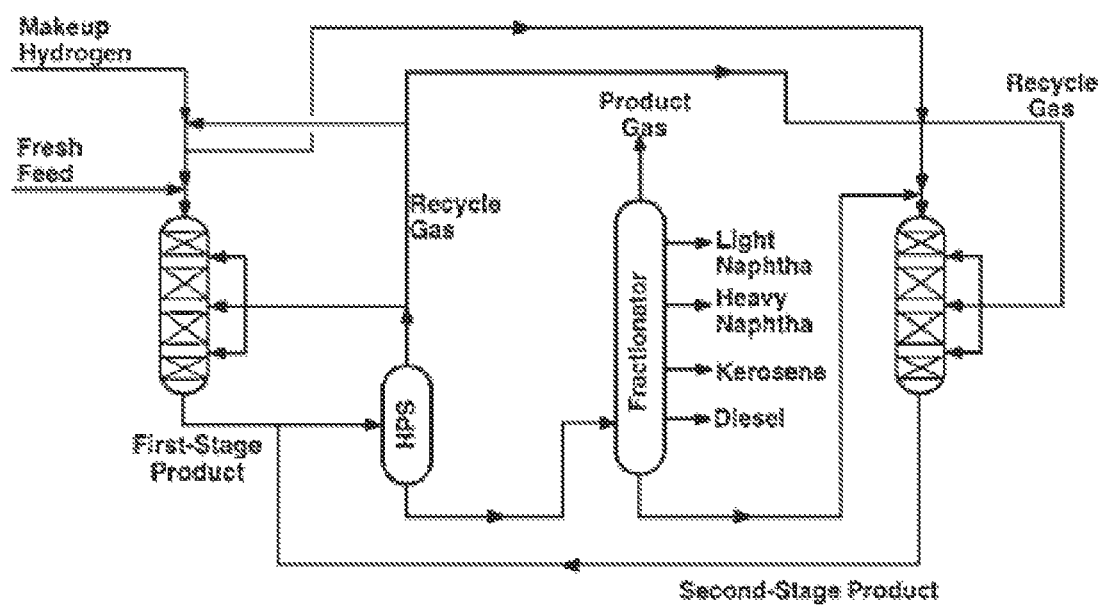
FIG. 1 is a diagram of an embodiment of a two-stage hydroprocessing unit having a second-stage hydrocracking reactor designed for optimizing yields of middle distillates.

"Hydrocracking" refers to a process in which hydrogenation and dehydrogenation accompanies the cracking/fragmentation of hydrocarbons, e.g., converting heavier hydrocarbons into lighter hydrocarbons, or converting aromatics and/or cycloparaffins(naphthenes) into non-cyclic branched paraffins.

"Second-stage hydrocracking" refers to a process for hydrocracking a hydrocarbonaceous feed produced in a first-stage hydroprocessing reactor. The second-stage hydrocracking is done in a second-stage hydrocracking reactor that is fluidly connected to the first-stage hydroprocessing reactor.

"TBP" refers to the boiling point of a hydrocarbonaceous feed or product, as determined by ASTM D2887-13.

"Cut point" refers to the temperature on a True Boiling Point (TBP) curve at which a predetermined degree of separation is reached.

"Hydrocarbonaceous" means a compound or substance that contains hydrogen and carbon atoms, and which can include heteroatoms such as oxygen, sulfur, or nitrogen.

"Hydrocracked boiling point" refers to the boiling point of a hydrocarbonaceous product produced in a hydrocracking reactor.

"OD acidity" refers to the amount of bridged hydroxyl groups exchanged with deuterated benzene at 80° C. by Fourier transform infrared spectroscopy (FTIR).

"Acid site distribution index (ASDI)" is an indicator of the hyperactive site concentration of a zeolite. ASDI is determined by the following equation: ASDI=(HF'+LF')/(HF+LF).

"Middle distillates" include products having cut points from 300° F. (149° C.) to 700° F. (371° C.). Middle distillates can include jet, kerosene, and diesel. Some typical naphthas and middle distillates for the North American market include the following:

| Products | Typical Cut Points, ° F. (° C.) for North American Market |
|---|---|
| Light Naphtha | $C_5$-180 ($C_5$-82) |
| Heavy Naphtha | 180-300 (82-149) |
| Jet | 300-380 (149-193) |
| Kerosene | 380-530 (193-277) |
| Diesel | 530-700 (277-371) |

"Finished catalyst" refers to the second-stage hydrocracking catalyst composition comprising all of its components and after all of the processing and any post-processing steps used to manufacture it.

"LHSV" means liquid hourly space velocity.

"WHSV" means weight hourly space velocity.

"SCFB" refers to a unit of standard cubic foot of gas (e.g., nitrogen, hydrogen, air, etc) per barrel of hydrocarbonaceous feed.

"$SiO_2/Al_2O_3$ mole ratio (SAR)" is determined by inductively coupled plasma (ICP) elemental analysis. A SAR of infinity means there is no aluminum in the zeolite, i.e., the mole ratio of silica to alumina is infinity. In that case, the zeolite is comprised of essentially all silica.

"Y zeolites" are synthetic faujasite (FAU) zeolites having a SAR of 3 or higher. Y zeolite can be ultra-stabilized by one or more of hydrothermal stabilization, dealumination, and isomorphous substitution. Zeolite USY can be any FAU-type zeolite with a higher framework silicon content than a starting (as-synthesized) Na—Y zeolite precursor.

"Periodic Table" refers to the version of the IUPAC Periodic Table of the Elements dated Jun. 22, 2007, and the numbering scheme for the Periodic Table Groups is as described in Chemical And Engineering News, 63(5), 27 (1985).

"Amorphous silica aluminate (ASA)" refers to a synthetic material having some of the alumina present in tetrahedral coordination as shown by nuclear magnetic resonance imaging. ASA can be used as a catalyst or catalyst support. Amorphous silica alumina contains sites which are termed Brönsted acid (or protic) sites, with an ionizable hydrogen atom, and Lewis acid (aprotic), electron accepting sites and these different types of acidic site can be distinguished by the ways in which, say, pyridine attaches.

"Pseudo-boehmite alumina refers to an aluminum compound with the chemical composition AlO(OH). Pseudo-boehmite alumina consists of finely crystalline boehmite with a higher water content than boehmite.

"API gravity" refers to the gravity of a petroleum feedstock or product relative to water, as determined by ASTM D4052-11.

"Polycyclic index (PCI)" refers to a measure of the content of compounds having several aromatic rings. PCI is useful in evaluating feedstocks for hydroprocessing. PCI is measured using UV-spectroscopy and is calculated as follows:

$$PCI=\{[Absorbance@385\ nm-(0.378 \times Absorbance@435\ nm)]/115 \times c\} \times 1000;$$

where c is the original concentration of the sample in solvent in g/cm$^3$.

"Noble metal" refers to a metal that is resistant to corrosion and oxidation in moist air (unlike most base metals). Examples of noble metals are ruthenium, rhodium, palladium, silver, osmium, iridium, platinum, and gold.

"Particle density" refers to the density of a catalyst including its pore volume in g/l, and can be measured by mercury porosimetry. The determination of particle density is based on the fact that mercury does not wet the surface of most materials, and therefore, will not enter the pores of a solid catalyst unless forced to under pressure. The particle density can be measured either volumetrically or gravimetrically by fully immersing the catalyst sample in mercury. In the gravimetric method, the equation for particle density (D) is: $D=(C \times \rho)/(A+B-C)$, where C is the catalyst sample weight, A is the weight of the test cell filled with mercury, B is the weight of the test cell with both the catalyst sample and mercury, and $\rho$ is the density of mercury. In the volumetric method, the equation for particle density (D) is: $D=C/\Delta V$, where $\Delta V$ is the difference in volume measurement in the test cell with and without the catalyst sample.

DETAILED DESCRIPTION

The distribution of the acid sites of a zeolite generally determines the catalytic activity and selectivity towards particular refining products. The ASDI provides a measurement of the super acid site concentration of a zeolite. During the commercial operation of a hydrocracking unit, the concentrations of the acid sites can increase, leading to increased hydrocracking of the hydrocarbonaceous feedstock. The increased hydrocracking can cause increased production of lesser value products such as light naphtha and $C_1$-$C_4$ gas. A second-stage hydrocracking catalyst comprising from 40 to 70 wt % zeolite USY having an ASDI from 0.05 to 0.18 provides an optimized balance of activity and selectivity to produce middle distillates and heavy naphtha, with significantly increased catalyst activity compared to previously known second-stage hydrocracking catalysts.

Second-Stage Hydrocracking Catalyst Composition:

The zeolite USY has an ASDI from 0.050 to 0.180, which is less than the ASDI of previously-known second stage hydrocracking catalysts used to produce high quality middle distillates.

In one embodiment, the zeolite USY has a total OD acidity of 0.200 to 0.500 mmol/g, such as 0.250 to 0.350 mmol/g. In one embodiment the zeolite USY has a total OD acidity of 0.300 to 0.325 mmol/g.

In one embodiment, the zeolite USY can have a zeolite SAR less than 60, such as from 15 to 55, or from 25 to 50.

In one embodiment, the zeolite USY has a zeolite BET surface area that is selected such that the BET surface area of the second-stage hydrocracking catalyst, made using the zeolite USY, is from 450 to 650 m$^2$/g. In one embodiment, the zeolite BET surface area is greater than 500 m$^2$/g, such as 600 to 900 m$^2$/g, or 750 to 780 m$^2$/g.

In one embodiment, the zeolite USY has a unit cell size less than 24.50 Å, such as 24.22 to 24.32 Å.

In one embodiment, the amorphous silica aluminate (ASA) has greater thermal stability than high purity alumina. Examples of suitable amorphous silica aluminates with good thermal stability are SIRAL® ASAs, described below:

TABLE 2

| Typical Properties | | SIRAL 1 | SIRAL 5 | SIRAL 10 | SIRAL 20 | SIRAL 30 | SIRAL 40 |
|---|---|---|---|---|---|---|---|
| Al$_2$O$_3$ + SiO$_2$ | % | 75 | 75 | 75 | 75 | 75 | 75 |
| Loss on Ignition (LOI) | % | 25 | 25 | 25 | 25 | 25 | 25 |
| Al$_2$O$_3$:SiO$_2$ | % | 99:1 | 95:5 | 90:10 | 80:20 | 70:30 | 60:40 |
| C | % | 0.2 | 0.2 | 0.2 | 0.2 | 0.2 | 0.2 |
| Fe$_2$O$_3$ | % | 0.02 | 0.02 | 0.02 | 0.02 | 0.02 | 0.02 |
| Na$_2$O | % | 0.005 | 0.005 | 0.005 | 0.005 | 0.005 | 0.005 |
| Loose bulk density | [g/l] | 600-800 | 450-650 | 400-600 | 300-500 | 250-450 | 250-450 |
| Particle size (d$_{50}$) | [µm] | 50 | 50 | 50 | 50 | 50 | 50 |
| Surface area (BET)* | [m$^2$/g] | 280 | 370 | 400 | 420 | 470 | 500 |
| Pore volume* | [ml/g] | 0.50 | 0.70 | 0.75 | 0.75 | 0.80 | 0.90 |

*After activation at 550° C. for 3 hours.

SIRAL® is a registered trademark of SASOL.

In one embodiment, the amorphous silica alumina can be selected such that when it is mixed with the zeolite USY and the second alumina, it provides the second-stage hydrocracking catalyst having a BET surface area from 450 to 650 m²/g. In one embodiment, the amorphous silica alumina has an alumina BET surface area greater than 250 m²/g, such as from 300 to 600 m²/g, or from 350 to 500 m²/g.

The second-stage hydrocracking catalyst additionally comprises a second alumina. In one embodiment the second alumina uses a pseudo-boehmite alumina starting material that gets converted during catalyst preparation into γ alumina. Examples of pseudo-boehmite alumina are CATAPAL® high purity aluminas CATAPAL® is a registered trademark of SASOL. Typical properties of the CATAPAL high purity aluminas are summarized below:

TABLE 3

| Typical Properties | CATAPAL B | CATAPAL C1 | CATAPAL D | CATAPAL 200 |
|---|---|---|---|---|
| Al₂O₃, wt % | 72 | 72 | 76 | 80 |
| Na₂O, wt % | 0.002 | 0.002 | 0.002 | 0.002 |
| Loose Bulk Density, g/l | 670-750 | 670-750 | 700-800 | 500-700 |
| Compacted Bulk Density, g/l | 800-1100 | 800-1100 | 800-1100 | 700-800 |
| Average Particle size (d₅₀), μm | 60 | 60 | 40 | 40 |
| Surface Area* (BET), m²/g | 250 | 230 | 220 | 100 |
| Pore Volume*, ml/g | 0.50 | 0.50 | 0.55 | 0.70 |
| Crystal size, nm | 4.5 | 5.5 | 7.0 | 40 |

*Surface area and pore volume were determined after activation at 550° C. for 3 hours.

In one embodiment, the second alumina has a second alumina BET surface area that is high enough such that the second-stage hydrocracking catalyst has a BET surface area from 450 to 650 m²/g. For example, the second alumina can have a second alumina BET surface area greater than 150 m²/g, such as from 155 to 350 m²/g, from 200 to 300 m²/g, or from 220 to 280 m²/g.

In one embodiment, the second alumina has an alumina compacted bulk density greater than 700 g/l, such as from 800 to 1100 g/l.

The second-stage hydrocracking catalyst additionally comprises at least one noble metal. The total amount of a noble metal in the second-stage hydrocracking catalyst is from 0.1 wt. % to 10 wt. % based on the bulk dry weight of the finished hydrocracking catalyst. In one embodiment, the noble metal is selected from the group of platinum, palladium, and mixtures thereof.

In different embodiments, the second-stage hydrocracking catalyst can have one or more of the following physical properties:

a. a compacted bulk density less than 690, such as 400 to 680 g/l, b. a LOI (1000° F.[538° C.]) less than 12 wt %, or from seven to less than 10 wt %, c. a SAR less than 5.0, such as from 1.0 to 3.0, d. a high Pd H2 adsorption, such as from 40 wt % to 70 wt %, or greater than 50 wt %, and e. a particle density less than 990 g/l, such as from 800 to 980 g/l.

In one embodiment, the second-stage hydrocracking catalyst is in the form of extruded pellets (extrudates) that have an extruded pellet diameter of 10 mm or less, such as from 1.0 to 5.0 mm. In one embodiment, the extruded pellet has a length-to-diameter ratio of 10 to 1. Examples of other types and sizes of pellets used for the second-stage hydrocracking catalysts are 1 to 10 mm diameter spheres; 1 to 10 mm diameter cylinders with a length-to-diameter ratio of 4 to 1; 1 to 10 mm asymmetric shapes (including quadrolobes), and up to 10 mm diameter hollow cylinders or rings.

The ° F. or ° C. more activity for a given catalyst is a commercially significant value since the overall kinetics of a hydrocracking process involves deactivation of the catalyst with time which requires the constant incremental increase in the operating temperature of the process as a function of time to maintain constant conversion of the hydrocarbon feedstock. The process equipment necessarily has temperature constraints such that when the process reaches a designated temperature the process must be shutdown, i.e., terminated, and the catalyst changed. Since these shutdowns are quite costly, a catalyst which provides the desired conversion at a lower temperature (as indicated by ° F. or ° C. more activity) has a longer life in the hydrocracking process since it requires a longer time to achieve the shutdown temperature. For example, the typical temperature increment for a commercial hydrocracking process can be on the order of 0.05 to 0.1° F. per day of operation and a catalyst which has 10° F. more activity can provide from 100 to 200 additional days of plant operation before catalyst changeover.

Second-Stage Hydrocracking Process

The second-stage hydrocracking catalysts described above can be used to hydrocrack hydrocarbonaceous feeds having an initial boiling point greater than 380° F. (193° C.).

In one embodiment, the hydrocarbonaceous feed comprises a first-stage hydrocracking reactor effluent. In another embodiment, the hydrocarbonaceous feed is a blend of an effluent from a first-stage hydrocracker and a raw feed, such as diesel. In one embodiment, the raw feed that is blended with the effluent from the first-stage hydrocracker is the feedstock to the first-stage hydrocracker. Examples of these types of raw feeds include visbroken gas oils, heavy coker gas oils, gas oils derived from residue hydrocracking or residue desulfurization, other thermally cracked oils, deasphalted oils, Fischer-Tropsch derived feedstocks, cycle oils from a fluid catalytic cracking (FCC) unit, heavy coal-derived distillates, coal gasification byproduct tars, heavy shale-derived oils, organic waste oils such as those from pulp or paper mills or from waste biomass pyrolysis units.

In one embodiment, the hydrocarbonaceous feed has a PCI less than 5000, such as from zero to less than 1000.

Table 4 lists some typical physical properties for a hydrocarbonaceous feed that can be used.

TABLE 4

| Property | |
|---|---|
| API Gravity | 13.5-30.0 |
| N, ppm | 0-500 |
| S, wt % | 0-0.5 |
| Polycyclic Index (PCI) | 0-8000 |
| TBP Range, ° F. (° C.) | 381-1200° F. (194-649° C.) |

Table 5 lists some typical hydrocracking process conditions that can be used.

TABLE 5

| Property | |
|---|---|
| Liquid Hourly Space Velocity (LHSV), hr$^{-1}$ | 0.1-5 |
| H$_2$ partial pressure, psig (kPa) | 400-3,500 (2758-24,132) |
| H$_2$ Consumption Rate, SCF/B | 50-20,000 |
| H$_2$ Recirculation Rate, SCF/B | 50-9,000 |
| Operating Temperature | 200-450° C. (392-842° F.) |
| Conversion (wt %) | 30-100 |

Depending on the feedstock, target product slate and amount of available hydrogen, the second-stage hydrocracking catalyst described herein can be used alone or in combination with other conventional hydrocracking catalysts.

In one embodiment, the second-stage hydrocracking catalyst is deployed in one or more fixed beds in a second-stage hydrocracking unit, with or without recycle (once-through). Optionally, the second-stage hydrocracking unit may employ multiple second-stage units operated in parallel.

In one embodiment, the second-stage hydrocracking catalyst is deployed in one or more beds or units in a two-stage hydrocracking unit, with and without intermediate stage separation, and with or without recycle. Two-stage hydrocracking units can be operated using a full conversion configuration (meaning all of the hydrotreating and hydrocracking is accomplished within the hydrocracking loop via recycle). This embodiment may employ one or more distillation units within the hydrocracking loop for the purpose of stripping off product prior to the second stage hydrocracking step or prior to recycle of the distillation bottoms back to the first and/or second stage.

Two stage hydrocracking units can also be operated in a partial conversion configuration (meaning one or more distillation units are positioned within a hydrocracking loop for the purpose of stripping of one or more streams that are passed on for further hydroprocessing). Operation of the second-stage hydrocracking unit or reactor in this manner allows a refinery to hydroprocess highly disadvantaged feedstocks by allowing undesirable feed components such as the polynuclear aromatics, nitrogen and sulfur species (which can deactivate hydrocracking catalysts) to pass out of the hydrocracking loop for processing by equipment better suited for processing these components, e.g., an FCC unit.

In one embodiment, the second-stage hydrocracking catalyst is used in the second stage of a partial conversion, two-stage hydrocracking configuration which is well suited for making at least one middle distillate and a heavy vacuum gas fluidized catalytic cracking feedstock (HVGO FCC), by:

(a) hydrocracking a hydrocarbonaceous feedstock to produce a first stage hydrocracked effluent;

(b) distilling the hydrocracked feedstock by atmospheric distillation to form at least one middle distillate fraction and an atmospheric bottoms fraction;

(c) further distilling the atmospheric bottoms fraction by vacuum distillation to form a side-cut vacuum gas oil fraction and a heavy vacuum gas oil FCC feedstock;

(d) second-stage hydrocracking the side-cut vacuum gas oil fraction to form a second stage hydrocracked effluent; and (e) combining the second stage hydrocracked effluent with the first stage hydrocracked effluent.

The refinery configuration illustrated above has several advantages over conventional two-stage hydrocracking schemes. First, in this configuration, the catalyst and operating conditions of the first stage are selected to yield a HVGO FCC stream having only the minimum feed qualities necessary to produce FCC products which meet the established commercial specifications. This is in contrast to a conventional two-stage hydrocracking scheme where the first stage hydrocracking unit is operated at a severity necessary to maximize distillate yield which, in turn, requires the unit to be operated at more severe conditions (which requires more hydrogen and reduces the life of the catalyst).

Second, in this optional configuration, the side-cut vacuum gas oil (VGO) sent to the second stage hydrocracker unit is cleaner and easier to hydrocrack than a conventional second-stage hydrocracker feed. Therefore, higher quality middle distillate products can be achieved using a smaller volume of second-stage hydrocracking catalyst which, in turn, allows for the construction of a smaller hydrocracker reactor and consumption of less hydrogen. The second-stage hydrocracking unit configuration reduces construction cost, lowers catalyst fill cost and operating cost.

Second-Stage Hydrocracking Catalyst Preparation

The second-stage hydrocracking catalyst can be prepared by:

a. mixing together from 40 wt % to 70 wt % of a zeolite USY having an ASDI from 0.05 to 0.18, an amorphous silica alumina, a second alumina, and enough liquid to form an extrudable paste;

b. extruding the extrudable paste to form an extrudate base;

c. impregnating the extrudate base with a metal impregnation solution containing at least one noble metal to make a metal-loaded extrudate; and d. post-treating the metal-loaded extrudate by subjecting the metal-loaded extrudate to drying and calcination; wherein the second-stage hydrocracking catalyst has: improved activity for producing products boiling within 250° F. (121° C.) to 700° F. (371° C.) and a BET surface area from 450 to 650 m$^2$/g.

The liquid used in step a) can be water or a mild acid. In one embodiment the liquid used in step a) is a diluted HNO$_3$ acid aqueous solution with from 0.5 to 5 wt % HNO$_3$.

Prior to impregnation, the extrudate base can be dried at a temperature between 90° C. (194° F.) and 150° C. (302° F.) for 30 minutes to 3 hours. The dried extrudate base can then be calcined at one or more temperatures between 350° C. (662° F.) and 700° C. (1292° F.).

In one embodiment, the metal impregnation solution is made by dissolving metal precursors in a solvent. Suitable solvents include water, C$_1$-C$_3$ alcohols, ethers, and amines. In one embodiment, the solvent is deionized water. In one embodiment, the impregnation solution is adjusted to a basic pH, such as a basic pH greater than 8. In one embodiment, the metal impregnation solution has a basic pH from 9.2 to 9.5. The concentration of the impregnation solution can be determined by the pore volume of the support and by the selected metal loading. In one embodiment, the extrudate base is exposed to the impregnation solution for 0.1 to 24 hours. If the second-stage hydrocracking catalyst comprises two or more metals, these metals can be impregnated sequentially or simultaneously.

In one embodiment the metal-loaded extrudate is dried at one or more temperatures in the range of 38° C. (100° F.) to 177° C. (350° F.) for 0.1 to 10 hours. The dried metal-loaded extrudate can be further calcined at one or more temperatures from 316° C. (600° F.) to 649° C. (1200° F.), with purging excess dry air, for 0.1 to 10 hours.

Products Made by Second-Stage Hydrocracking

The second stage hydrocracking catalyst can produce optimized yields of naphtha, jet fuel, and diesel. In one embodiment the second-stage hydrocracking process using the second-stage hydrocracking catalyst and processes described herein can produce an effluent that comprises less than 15 wt % boiling below 180° F. In one embodiment, the second-stage hydrocracking processes described herein produce an effluent from the second-stage hydrocracking reactor that comprises from 80 to 95 wt % products having a TBP boiling point from 180° F. (82.2° C.) to 700° F. (371° C.).

EXAMPLES

Example 1: Preparation of Catalyst Sample A

Catalyst sample A was prepared by combining, on a dry basis, 126.1 g SIRAL 30, 135.4 g CATAPAL B, and 338.5 g ZEOLITE USY A; and mixing them well. The properties of the ZEOLITE USY A are summarized in Table 6.

TABLE 6

| | |
|---|---|
| $SiO_2/Al_2O_3$ Mole Ratio | 30 |
| Nominal Cation Form | Hydrogen |
| $Na_2O$, Wt % | 0.03 |
| Unit Cell Size, Å | 24.28 |
| Surface Area, $m^2/g$ | 780 |

The ZEOLITE USY A had an acid site distribution index (ASDI) of 0.156. Additional properties of the ZEOLITE USY A are summarized in Table 7.

TABLE 7

| Bronsted acid sites determined by FTIR after H/D exchange (mmol/g) | |
|---|---|
| HF(OD) | 0.173 |
| HF'(OD) | 0.034 |
| LF(OD) | 0.096 |
| LF'(OD) | 0.008 |
| Total OD Acidity | 0.311 |
| ASDI | 0.16 |

The OD acidity was determined by H/D exchange of acidic hydroxyl groups by FTIR spectroscopy. The method to determine the OD acidity was adapted from the method described in the publication by Emiel J. M. Hensen et. al., J. Phys. Chem., C2010, 114, 8363-8374. Prior to FTIR measurement, the sample was heated for one hour at 400-450° C. under vacuum $<1 \times 10^{-5}$ Torr. Then the sample was dosed with $C_6D_6$ to equilibrium at 80° C. Before and after $C_6D_6$ dosing, spectra were collected for OH and OD stretching regions. Brönsted acid sites density (OD acidity) was determined by using the integrated area of peak 2660 $cm^{-1}$ for zeolite beta. Brönsted acid sites density for USY was determined by using the integrated area of peak 2676 $cm^{-1}$ as the first high frequency OD (HF), 2653 $cm^{-1}$ as the 2nd high frequency OD (HF'), 2632 $cm^{-1}$ and 2620 $cm^{-1}$ as the first low frequency OD (LF) and 2600 $cm^{-1}$ as the 2nd low frequency OD (LF'). The OD acidity is the sum of the various deuteroxyl site densities, in mmol/g.

ASDI is determined by H/D exchange of acidic hydroxyl groups by FTIR spectroscopy, as described previously. The ASDI was calculated by the following equation: ASDI= (HF'+LF')/(HF+LF).

To this mixture described above, a diluted $HNO_3$ acid aqueous solution (3 wt %) was added to form an extrudable paste. The extrudable paste was extruded into an asymmetric quadrolobe shape, and dried at 266° F. (130° C.) for 1 hour. The dried extrudates were calcined at 1100° F. (593° C.) for 1 hour with purging excess dry air, and cooled down to 300° F. (149° C.).

Pd was pore volume impregnated onto the dried extruded catalyst base described above by immersing the dried extruded catalyst base into a Pd solution containing 1.003 g Pd and having a pH from 9.2-9.5. The Pd solution was made by mixing $Pd(NH_3)_4(NO_3)_2$, ammonia water, and deionized water. 200 g (dry basis) of the dried extruded catalyst base was immersed in the Pd solution at room temperature for twelve hours. The metal impregnated extruded catalyst was dried at 300° F. (149° C.) for 1 hour. The dried catalyst was then calcined at 950° F. (510° C.) for 1 hour with purging excess dry air, and cooled down to room temperature. The composition and physical properties of this finished Catalyst Sample A are shown in Table 11.

Example 2: Comparative Catalyst Sample B

Comparative Catalyst Sample B was made by preparing the catalyst base and impregnating the base with Pd, similar to the steps used to prepare Catalyst Sample A. VERSAL™-250 was used instead of SIRAL 30. ZEOLITE USY B was used instead of ZEOLITE USY A.

VERSAL-250 is a pseudo boehmite alumina supplied by UOP. The chemical properties of VERSAL-250 are described in Table 8.

TABLE 8

| Typical Properties | | |
|---|---|---|
| $SiO_2$ | wt % | <0.15 |
| Cl | % | <0.15 |
| $Na_2O$ | % | <0.04 |
| Loss on Ignition (LOI) | % | 26 |
| Loose Bulk Density | [g/l] | 192-256 |
| Surface area (BET)* | [$m^2/g$] | 320 |

*After calcining at 600° C.

The properties of the ZEOLITE USY B are summarized in Table 9.

TABLE 9

| | |
|---|---|
| $SiO_2/Al_2O_3$ Mole Ratio | 12 |
| Nominal Cation Form | Ammonium |
| $Na_2O$, Wt % | 0.05 |
| Unit Cell Size, Å | 24.35 |
| Surface Area, $m^2/g$ | 730 |

The ZEOLITE USY B had an acid site distribution index (ASDI) of 0.28. Additional properties of the ZEOLITE USY B are summarized in Table 10.

TABLE 10

| Bronsted acid sites determined by FTIR after H/D exchange (mmol/g) | |
|---|---|
| HF(OD) | 0.297 |
| HF'(OD) | 0.108 |

TABLE 10-continued

| Bronsted acid sites determined by FTIR after H/D exchange (mmol/g) | |
|---|---|
| LF(OD) | 0.170 |
| LF'(OD) | 0.024 |
| Total OD Acidity | 0.601 |
| ASDI | 0.28 |

The chemical compositions and physical properties of these two different noble metal impregnated catalysts are described in Table 11.

TABLE 11

Catalyst Compositions and Physical Properties

| | Comparative Catalyst Sample B | Catalyst Sample A |
|---|---|---|
| Base Description | 35.0 wt % VERSAL-250, 35.0 wt % CATAPAL B, 30 wt % ZEOLITE USY B. | 21.0 wt % SIRAL 30, 22.6 wt % CATAPAL B, 56.4 wt % ZEOLITE USY A |
| Surface Area (BET), m²/g | 394 | 572 |
| N₂ Micropore Volume, cm³/g | 0.65 | 0.62 |
| Compacted Bulk Density, g/l | 690 | 580 |
| Particle Density, g/l | 990 | 920 |
| LOI (1000° F.), wt % | 10.3 | 8.90 |
| Pd H₂ Adsorption, wt % | 46.1 | 54.5 |
| Al₂O₃, wt % | 73.3 | 55.48 |
| SiO₂, wt % | 26.12 | 43.94 |
| PdO, wt % | 0.58 | 0.58 |
| SiO₂/Al₂O₃ Molar Ratio (SAR) | 0.60 | 1.34 |

Surface area (BET) was measured by ASTM D3663-03 (Reapproved 2008).

N2 micropore volume was measured by ASTM D4365-13.

Compacted bulk density was measured by ASTM D4512-03(2013)ε1.

Particle density was measured by mercury porosimetry.

Loss on ignition [LOI (1000° F.)] was measured by ASTM D7348-13.

Pd H2 adsorption was measured by ASTM D3908-03 (Reapproved 2008).

Example 3: Hydrocracking Second-Stage Feeds

The example catalysts described above were used to process two different hydrocracking second-stage feeds produced in first-stage ISOCRACKING® hydrocracking units. The properties of these two different hydrocracking second-stage feeds are described in Table 12.

TABLE 12

| Feed Description and Properties | Feed 1 | Feed 2 |
|---|---|---|
| API Gravity | 37 | 35.1 |
| N, ppm | <0.3 | 1.24 |
| S, wt % | <5 | 22 |
| H, wt % by NMR | 14.04 | 14.04 |
| Polycyclic Index (PCI) | 35 | 534 |

TABLE 12-continued

| Feed Description and Properties | Feed 1 | Feed 2 |
|---|---|---|
| Kinematic Viscosity at 70° C., mm²/s | 3.77 | 6.831 |
| Kinematic Viscosity at 100° C., mm²/s | 2.25 | 3.726 |
| Viscosity Index | 96 | 121 |
| Carbon Residue by MCRT, wt % | 0.02 | 0.00 |
| 22 × 22 Mass Spec, vol % | | |
| Paraffins | 45.1 | 44.1 |
| Naphthenes | 48.1 | 50.6 |
| Aromatics | 6.8 | 5.3 |
| Sulfur | 0.0 | 0.0 |
| TBP Range, ° F. (° C.) | | |
| 0.5 | 453 | 529 |
| 5 | 503 | 591 |
| 10 | 532 | 626 |
| 30 | 606 | 706 |
| 50 | 658 | 760 |
| 70 | 707 | 819 |
| 90 | 781 | 912 |
| 95 | 819 | 952 |
| 99 | 886 | 1007 |
| End Point | 908 | 1021 |

ISOCRACKING® is a registered trademark of Chevron Intellectual Property LLC. ISOCRACKING processes are described in A.G. Bridge and U.K. Mukherjee, "Isocracking-Hydrocracking for Superior Fuels and Lube Production," Handbook of Petroleum Refining Processes, 3$^{rd}$ ed., R. A. Meyers ed., Chapter 7.1, McGraw-Hill, 2003.

Example 4: Comparison of Second-Stage Hydrocracking of Feed 1

Figure 2:
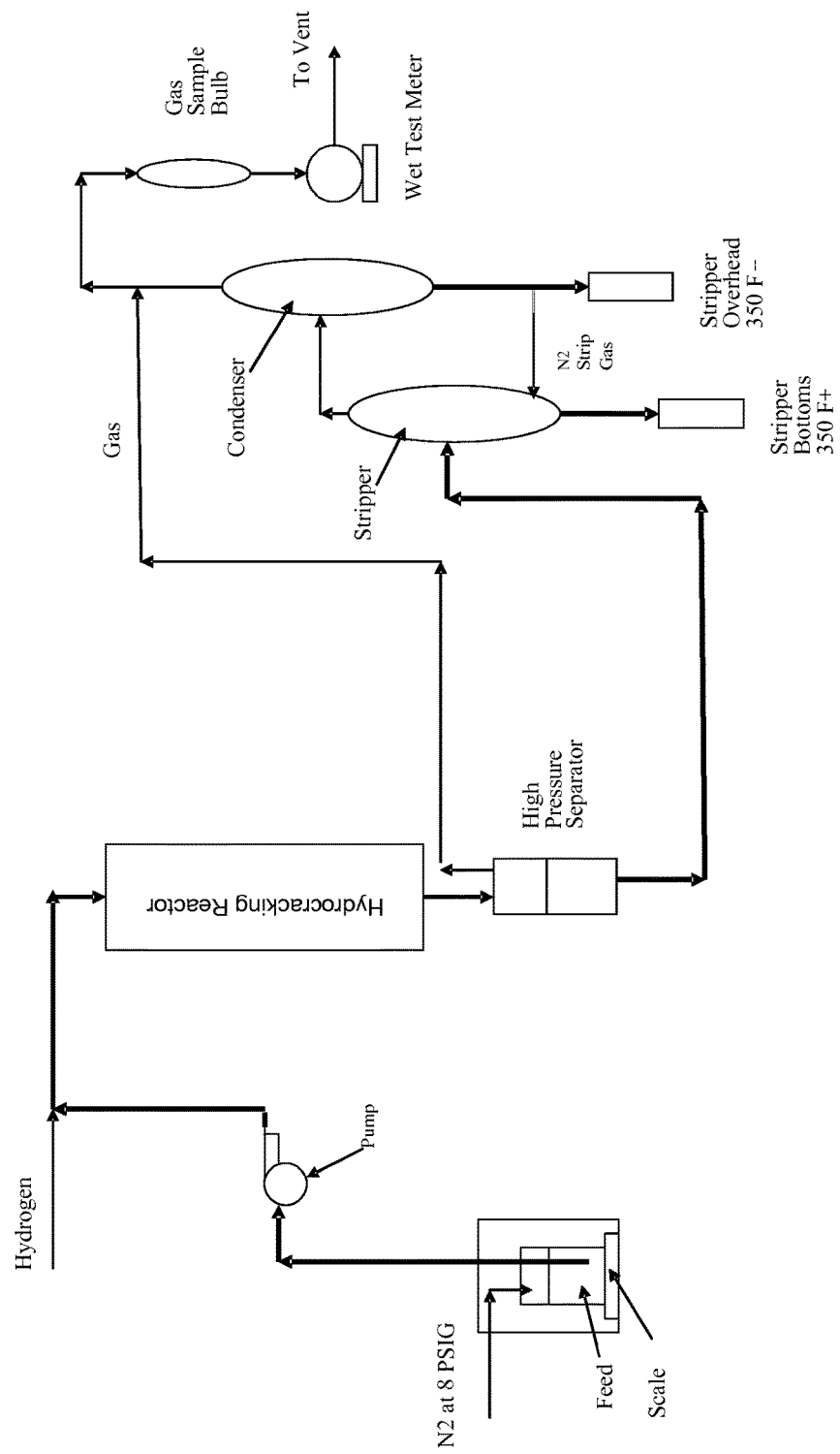
FIG. 2 is a diagram of the pilot plant used for the evaluation of the second-stage hydrocracking catalysts in this disclosure.

Hydrocracking tests were performed using Feed 1 in the pilot plant that is shown in FIG. 2. The results are summarized below in Table 13.

TABLE 13

| | Catalyst | |
|---|---|---|
| | Comparative Catalyst Sample B | Catalyst Sample A |
| | Feed | |
| | Feed 1 | Feed 1 |
| Temperature, ° F. (° C.) | 539 (282) | 527 (275) |
| WHSV | 1.58 | 1.81 |
| LHSV | 1.16 | 1.13 |
| Total Pressure, psig | 1279 | 1288 |
| Inlet H₂ Pressure, psia | 1222 | 1232 |
| Gas Rate, SCFB | 6344 | 6530 |
| Conversion <625° F., wt % | 35.52 | 35.85 |
| H₂ Consumption, SCFB | 349 | 379 |
| No Loss Yields, wt % | | |
| Methane | 0.00 | 0.00 |
| Ethane | 0.00 | 0.00 |
| Propane | 0.11 | 0.12 |
| i-Butane | 0.79 | 0.98 |
| n-Butane | 0.15 | 0.18 |

TABLE 13-continued

|  | Catalyst | |
|---|---|---|
|  | Comparative Catalyst Sample B | Catalyst Sample A |
|  | Feed | |
|  | Feed 1 | Feed 1 |
| $C_5$-180° F. | 4.55 | 5.04 |
| 180-380° F. | 12.29 | 12.31 |
| 380-525° F. | 18.54 | 18.46 |
| 525-625° F. | 23.44 | 22.39 |
| 625° F.+ | 41.83 | 41.21 |
| Mass Closure, Wt % | 99.19 | 99.59 |

The catalyst sample A was 12° F. (7° C.) more active than comparative catalyst sample B and gave almost identical product yields.

Example 5: Comparison of Second-Stage Hydrocracking of Feed 2

Hydrocracking tests were performed using Feed 2 in the pilot plant that is shown in FIG. 2, with 57 wppm $NH_3$ at the reactor inlet. The results are summarized below in Table 14.

TABLE 14

|  | Catalyst | |
|---|---|---|
|  | Comparative Catalyst Sample B | Catalyst Sample A |
|  | Feed | |
|  | Feed 2 | Feed 2 |
| Temperature, ° F. (° C.) | 648 (342) | 628 (331) |
| WHSV | 2.63 | 3.06 |
| LHSV | 1.91 | 1.89 |
| Total Pressure, psig | 1964 | 1880 |
| Inlet $H_2$ Pressure, psia | 1881 | 1802 |
| Gas Rate, SCFB | 5899 | 5977 |
| Conversion <556° F., wt % | 48.7 | 49.23 |
| $H_2$ Consumption, SCFB | 479 | 451 |
| No Loss Yields, wt % | | |
| Methane | 0.01 | 0.00 |
| Ethane | 0.01 | 0.01 |
| Propane | 0.33 | 0.33 |
| i-Butane | 1.45 | 1.63 |
| n-Butane | 0.54 | 0.53 |
| $C_5$-180° F. | 8.18 | 8.34 |

TABLE 14-continued

|  | Catalyst | |
|---|---|---|
|  | Comparative Catalyst Sample B | Catalyst Sample A |
|  | Feed | |
|  | Feed 2 | Feed 2 |
| 180-316° F. | 11.88 | 11.95 |
| 316-556° F. | 28.24 | 28.39 |
| 556-625° F. | 8.59 | 8.39 |
| 625° F.+ | 42.81 | 42.50 |
| Mass Closure, Wt % | 99.07 | 98.54 |

The catalyst sample A was 20° F. (11° C.) more active than comparative catalyst sample B and gave almost identical product yields.

Example 6: Distilled Products Comparison

The effluents from the hydrocracking runs described in Example 5, using Feed 2, were distilled into two fractions approximating jet and diesel fractions. The properties of the two different fractions made from the two runs are summarized in Table 15.

TABLE 15

|  | Catalyst | | | |
|---|---|---|---|---|
|  | Comparative Catalyst Sample B Cut 1, IBP-556° F. Jet | Comparative Catalyst Sample B Cut 2, 556-625° F. Diesel | Catalyst Sample A Cut 1, IBP-556° F. Jet | Catalyst Sample A Cut 2, 556-625° F. Diesel |
| Actual Cut Point, ° F. | 564 | 654 | 557 | 637 |
| Distillation Yields, wt % | 29.51 | 16.79 | 32.15 | 12.86 |
| API Gravity | 46.4 | 43.6 | 47.6 | 43.9 |

TABLE 15-continued

| | Catalyst | | | |
|---|---|---|---|---|
| | Comparative Catalyst Sample B Cut 1, IBP-556° F. Jet | Comparative Catalyst Sample B Cut 2, 556-625° F. Diesel | Catalyst Sample A Cut 1, IBP-556° F. Jet | Catalyst Sample A Cut 2, 556-625° F. Diesel |
| N, wppm | <0.03 | <0.03 | <0.03 | <0.03 |
| S, wppm | <5 | <5 | <5 | <5 |
| H, by NMR, wt % | 14.62 | 14.69 | 14.73 | 14.69 |
| Cloud Point, ° C. | −48 | −5 | −54 | −9 |
| Smoke Point, mm | 43 | — | 36 | — |
| Cetane Index | — | 69 | — | 69 |
| Kinematic viscosity at 40° C., mm$^2$/s | 1.864 | 4.681 | 1.671 | 4.493 |
| SFC Aromatics, wt % | | | | |
| Mono-aromatics | <0.5 | 1.0 | <0.5 | 0.9 |
| PNAs | 1.0 | 2.2 | 0.6 | 1.9 |
| TBP Range, ° F., by wt % | | | | |
| 0.5/5 | 288/333 | 505/549 | 279/321 | 518/547 |
| 10/30 | 359/415 | 562/587 | 340/397 | 557/581 |
| 50/ | 461/ | 605/ | 440/ | 597/ |
| 70/90 | 505/551 | 621/644 | 486/537 | 614/635 |
| 95/99.5 | 568/600 | 654/677 | 553/585 | 646/672 |

Cloud points were measured by ASTM D2500-11.
Smoke points were measured by ASTM D1322-14.
Cetane index was measured by ASTM D613-14.
Kinematic viscosity was measured by ASTM D445-14(E 2014).
SFC Aromatics were measured by ASTM D5186-03 (Reapproved 2009).

The jet and diesel product properties from the hydrocracking runs using the two different catalysts were very similar to each other. The SFC aromatics were lower in the jet and diesel fractions made using the Sample Catalyst A. The cloud points of the jet and diesel fractions were also lowered with the Sample Catalyst A.

The transitional term "comprising", which is synonymous with "including," "containing," or "characterized by," is inclusive or open-ended and does not exclude additional, unrecited elements or method steps. The transitional phrase "consisting of" excludes any element, step, or ingredient not specified in the claim. The transitional phrase "consisting essentially of" limits the scope of a claim to the specified materials or steps "and those that do not materially affect the basic and novel characteristic(s)" of the claimed invention.

For the purposes of this specification and appended claims, unless otherwise indicated, all numbers expressing quantities, percentages or proportions, and other numerical values used in the specification and claims, are to be understood as being modified in all instances by the term "about." Furthermore, all ranges disclosed herein are inclusive of the endpoints and are independently combinable. Whenever a numerical range with a lower limit and an upper limit are disclosed, any number falling within the range is also specifically disclosed. Unless otherwise specified, all percentages are in weight percent.

Any term, abbreviation or shorthand not defined is understood to have the ordinary meaning used by a person skilled in the art at the time the application is filed. The singular forms "a," "an," and "the," include plural references unless expressly and unequivocally limited to one instance.

All of the publications, patents and patent applications cited in this application are herein incorporated by reference in their entirety to the same extent as if the disclosure of each individual publication, patent application or patent was specifically and individually indicated to be incorporated by reference in its entirety.

This written description uses examples to disclose the invention, including the best mode, and also to enable any person skilled in the art to make and use the invention. Many modifications of the exemplary embodiments of the invention disclosed above will readily occur to those skilled in the art. Accordingly, the invention is to be construed as including all structure and methods that fall within the scope of the appended claims. Unless otherwise specified, the recitation of a genus of elements, materials or other components, from which an individual component or mixture of components can be selected, is intended to include all possible subgeneric combinations of the listed components and mixtures thereof.

The invention illustratively disclosed herein suitably may be practiced in the absence of any element which is not specifically disclosed herein.

It is claimed:

1. A second-stage hydrocracking catalyst, comprising:
   a. from 40 wt % to 70 wt % of a zeolite USY having an ASDI from 0.05 to 0.18;
   b. an amorphous silica alumina;
   c. an alumina; and
   d. 0.1 to 10 wt % noble metal;
   wherein the second-stage hydrocracking catalyst has a BET surface area from 450 to 650 m$^2$/g.

2. The second-stage hydrocracking catalyst of claim 1, wherein the zeolite USY has a total OD acidity of 0.200 to 0.500 mmol/g.

3. The second-stage hydrocracking catalyst of claim 1, wherein the zeolite USY has a zeolite SAR from 25 to 50.

4. The second-stage hydrocracking catalyst of claim 1, wherein the zeolite USY has a zeolite BET surface area from 750 to 780 mg$^2$/g.

5. The second-stage hydrocracking catalyst of claim 1, wherein the zeolite USY has a unit cell size of 24.22 to 24.32 Å.

6. The second-stage hydrocracking catalyst of claim 1, wherein the amorphous silica alumina has an alumina BET surface area from 350 to 500 mg$^2$/g.

7. The second-stage hydrocracking catalyst of claim 1, wherein the alumina has an alumina BET surface area from 220 to 280 mg$^2$/g.

8. The second-stage hydrocracking catalyst of claim 1, wherein the alumina has an alumina compacted bulk density of 800 to 1100 g/l.

9. The second-stage hydrocracking catalyst of claim 1, wherein the second-stage hydrocracking catalyst has a compacted bulk density of 400 to 680 g/l.

10. The second-stage hydrocracking catalyst of claim 1, wherein the second-stage hydrocracking catalyst has a LOI (1000° F. [538° C.]) less than 10 wt %.

11. The second-stage hydrocracking catalyst of claim 1, wherein the second-stage hydrocracking catalyst has a SAR from 1.0 to 3.0.

12. The second-stage hydrocracking catalyst of claim 1, wherein the second-stage hydrocracking catalyst has a Pd H2 adsorption greater than 50 wt %.

13. The second-stage hydrocracking catalyst of claim 1, wherein the second-stage hydrocracking catalyst has a particle density less than 980 g/l.

14. A method for making the second-stage hydrocracking catalyst of claim 1, the method comprising:
   a. mixing together from 40 wt % to 70 wt % of a zeolite USY having an ASDI from 0.05 to 0.18, an amorphous silica alumina, an alumina, and enough liquid to form an extrudable paste;
   b. extruding the extrudable paste to form an extrudate base;
   c. impregnating the extrudate base with a metal impregnation solution containing at least one noble metal to make a metal-loaded extrudate; and
   d. post-treating the metal-loaded extrudate by subjecting the metal-loaded extrudate to drying and calcination.

15. The method for making a second-stage hydrocracking catalyst of claim 14, wherein the metal impregnation solution has a basic pH from 9.2 to 9.5.

* * * * *